J. Shaw.

Metals.

No. 3,506. Reissued Jan. 15, 1869.

Witnesses.
G. W. Coombs
Henry Morris

Inventor.
J. Shaw
per Munn & Co
Attorneys

UNITED STATES PATENT OFFICE.

THE SHAW & WILCOX COMPANY, OF BRIDGEPORT, CONN., ASSIGNEE, BY MESNE ASSIGNMENTS, OF JEHYLEMAN SHAW.

IMPROVED APPARATUS FOR RECOVERING GOLD AND SILVER FROM WASTE SOLUTIONS.

Specification forming part of Letters Patent No. 35,842, dated July 8, 1862; Reissue No. 1,651, dated April 5, 1864, Reissue No. 3,506, dated June 15, 1869.

*To all whom it may concern:*

Whereas, JEHYLEMAN SHAW, of Bridgeport, Fairfield county, Connecticut, did invent a new and Improved Apparatus for Recovering Gold, Silver, &c., from Waste Solutions, for which Letters Patent of the United States were granted July 8, 1862, and reissued April 5, 1864, No. 1,651; and, whereas, by a proper instrument in writing duly recorded in the Patent Office of the United States, he has transferred and assigned all his right, title, and interest in and to the said invention and Letters Patent to THE SHAW & WILCOX COMPANY, of Bridgeport, aforesaid, which said company was organized January 16, 1868, of which the said JEHYLEMAN SHAW is president. Now, therefore, the said SHAW & WILCOX COMPANY do hereby declare that the following is a full, clear, and exact description thereof, which will enable others skilled in the art to make and use the same, reference being had to the accompanying drawings, forming part of this specification, in which—

Figure 1:
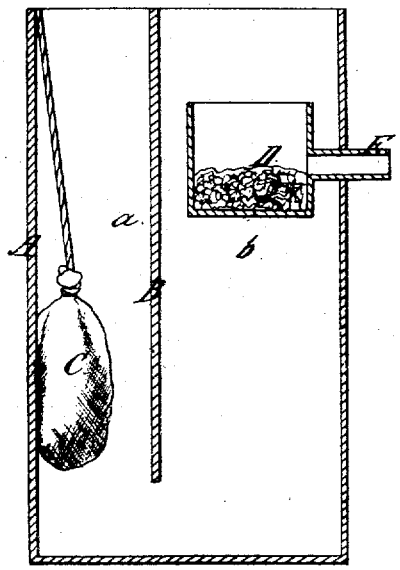
Figure 2:
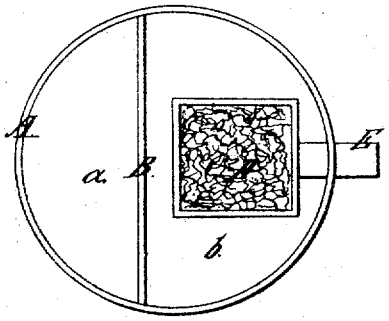

Figure 1 represents a vertical central section of the improved apparatus for recovering gold, silver, &c., from waste solution. Fig. 2 is a plan or top view of the same.

Similar letters of reference indicate corresponding parts.

The object of this invention is to provide means for recovering from the waste metallic solutions used by photograhers and others the gold, silver, or other valuable metal contained therein after the solution has been used and spent.

The invention consists in providing a vessel into which the discharged waste can be poured or conducted, and in which chemicals are placed to precipitate the gold, silver, or other metal in the waste, so that the latter will be separated from the metal.

A in the drawings represents a vessel made of metal or other suitable materials of suitable form and size. In it may be suspended a bag, C, which contains protosulphate of iron or other ingredients for precipitating the gold, silver, &c., contained in the solution. Such ingredients may, however, be placed in a loose state into the vessel A, and will have the same effect; or in their place sheet zinc or copper or other material may be used.

The operation will be simple. The waste solution is conducted or poured into the vessel A, and is therein separated from its metallic ingredients. When the same have settled, the liquid can be drawn off through a suitable pipe, E, arranged on any suitable part of the vessel A; or it may be allowed to flow over the top of edge the vessel. On the pipe E may be arranged a box, D, containing a sponge or suitable filtering device for arresting any particles of metal that may have been carried along in the liquid; but such filtering apparatus can be dispensed with for the majority of solutions.

A vertical partition, B, may be arranged in the vessel A to cause a double passage of the liquid and to prevent a current from being formed while it passes off through the pipe E or its equivalent. The partition may, however, also be dispensed with.

The same apparatus may be used for recovering gold, silver, and other metals from the washings of photographs and for other equivalent purposes.

Having thus described the invention, we claim as new and desire to secure by Letters Patent—

An apparatus for recovering gold, silver, &c., from waste solutions by means of suitable precipitating ingredients, substantially as herein specified.

JEHYLEMAN SHAW,
*President.*
ALONZO SCRANTON,
*Secretary.*

Witnesses:
J. HENRY THOMPSON,
JOSEPH THOMPSON.